(12) United States Patent
Hanaki et al.

(10) Patent No.: US 12,007,353 B2
(45) Date of Patent: Jun. 11, 2024

(54) METHOD FOR PRODUCING GAS SENSOR ELEMENT, GAS SENSOR ELEMENT, AND GAS SENSOR

(71) Applicant: NGK SPARK PLUG CO., LTD., Nagoya (JP)

(72) Inventors: Yuki Hanaki, Nagoya (JP); Suguru Kyomoto, Nagoya (JP); Kaoru Osaki, Nagoya (JP); Kotaro Ueda, Nagoya (JP); Masaki Nakagawa, Nagoya (JP)

(73) Assignee: NITERRA CO., LTD., Nagoya (JP)

( * ) Notice: Subject to any disclaimer, the term of this patent is extended or adjusted under 35 U.S.C. 154(b) by 386 days.

(21) Appl. No.: 17/392,368

(22) Filed: Aug. 3, 2021

(65) Prior Publication Data

US 2022/0050075 A1 Feb. 17, 2022

(30) Foreign Application Priority Data

Aug. 11, 2020 (JP) .................. 2020-135828

(51) Int. Cl.
| | | |
|---|---|---|
| *G01N 27/409* | (2006.01) | |
| *B05D 1/18* | (2006.01) | |
| *B05D 1/38* | (2006.01) | |
| *B05D 3/00* | (2006.01) | |
| *B05D 7/00* | (2006.01) | |
| *G01N 27/41* | (2006.01) | |

(52) U.S. Cl.
CPC .............. *G01N 27/409* (2013.01); *B05D 1/18* (2013.01); *B05D 1/38* (2013.01); *B05D 3/007* (2013.01); *B05D 7/534* (2013.01); *B05D 2401/20* (2013.01); *G01N 27/41* (2013.01)

(58) Field of Classification Search
CPC .. G01N 27/409; G01N 27/41; G01N 27/4072; G01N 27/406; G01N 27/4075; G01N 27/4067; G01N 27/407; G01N 27/4074; G01N 27/4118; G01N 27/00; G01N 27/4071; G01N 27/4077; G01N 33/0036; G01N 27/4073; B05D 1/18; B05D 1/38; B05D 3/007; B05D 7/534; B05D 2401/20
See application file for complete search history.

(56) References Cited

U.S. PATENT DOCUMENTS

| | | | | |
|---|---|---|---|---|
| 2004/0217000 A1* | 11/2004 | Yamamoto | ......... | G01N 27/4071 204/426 |
| 2012/0211362 A1* | 8/2012 | Onkawa | ............. | G01N 27/4077 204/424 |
| 2015/0075254 A1* | 3/2015 | Sakuma | ............. | G01N 27/4072 73/23.31 |

FOREIGN PATENT DOCUMENTS

JP 2017-203716 A 11/2017

* cited by examiner

*Primary Examiner* — Brandi N Hopkins
(74) *Attorney, Agent, or Firm* — Sughrue Mion, PLLC

(57) ABSTRACT

A method for producing a gas sensor element, for covering a detection portion (150) by an inner protection layer (21) and an outer protection layer (22), including: a first dipping step of dipping the gas sensor element into a first slurry S1 for the inner protection layer, to form a first coating film (700) on a front end surface (100*c*) and a peripheral surface (100*d*); a drying step of drying and solidifying the first coating film; a second dipping step of dipping, without removing the first coating film, the gas sensor element into a second slurry S2 for the outer protection layer, to form a second coating film (800) on a surface of the solidified first coating film; and a scraping-off step of performing scraping-off on the second coating film so as not to scrape-off the first coating film, to remove a part of the second coating film.

7 Claims, 12 Drawing Sheets

METHOD FOR PRODUCING GAS SENSOR ELEMENT, GAS SENSOR ELEMENT, AND GAS SENSOR

BACKGROUND OF THE INVENTION

1. Field of the Invention

The present invention relates to: a method for producing a gas sensor element that is suitably used for detecting the concentration of a specific gas contained in combustion gas or exhaust gas from a combustor, an internal combustion engine, or the like, for example; the gas sensor element; and a gas sensor.

2. Description of the Related Art

To date, a gas sensor for detecting the concentration of a specific component (e.g., oxygen) in exhaust gas from an internal combustion engine has been known. A gas sensor of this type includes therein a gas sensor element having an elongated plate shape. A front end portion of the gas sensor element is provided with a detection portion for detecting the specific component. The detection portion is composed of an electrode and the like, and the front end portion, of the gas sensor element, provided with such a detection portion is exposed to exhaust gas.

Exhaust gas contains catalytically poisonous substances such as silicon or phosphorus, other than the specific component, and such a poisonous substance attaches to the front end portion (detection portion, etc.) of the gas sensor element in some cases. The exhaust gas also contains water, and such water and water such as condensed water from an exhaust pipe also attaches to the front end portion of the gas sensor element in some cases. When water attaches to the gas sensor element, damage such as cracks may occur in the gas sensor element. Therefore, a porous protection layer for suppressing attachment of the poisonous substance and contact of water (water drops) is formed in the front end portion of a conventional gas sensor element. The porous protection layer is formed so as to cover the detection portion at the front end portion of the gas sensor element.

Meanwhile, as a porous protection layer, a stacked inner protection layer and an outer protection layer having different porosities is also known. In the case of such a two-layer-type protection layer, if, for example, the porosity of the inner protection layer is increased, water from the outside can be suppressed, by capillary action, from permeating from the outer protection layer to the inner protection layer.

As a conventional art of forming such a porous protection layer in a gas sensor element, a method (dip method) of dipping the gas sensor element into a slurry for the porous protection layer is known, for example (see Patent Document 1). In a method of this type, the front end portion of the gas sensor element is dipped into the slurry, to attach the slurry to the front end portion. Then, the attached slurry is sintered, to form the porous protection layer on the front end portion of the gas sensor element.

[Patent Document 1] Japanese Patent Application Laid-Open (kokai) No. 2017-203716

3. Problems to be Solved by the Invention

In the aforementioned method of dipping the gas sensor element into the slurry, controlling the thickness of the porous protection layer is difficult, which is problematic. For example, corner portions of the gas sensor element are portions to which the slurry is difficultly attached when compared with the other portions. Therefore, when the thickness of the porous protection layer at such corner portions is increased, more than the necessary amount of the slurry is attached to most portions other than the corner portions of the gas sensor element. When the slurry in this state is sintered, a porous protection layer having a large thickness (volume) is eventually formed. In this case, the heat capacity of the porous protection layer becomes too large, resulting in a delay in activating the gas sensor element by heating.

Therefore, in the above conventional art, in order to reduce the thickness of the porous protection layer, a process of cutting, with a cutter or the like, excess portions around the porous protection layer is performed after the sintering. However, when the cutting is performed after the sintering, the porous protection layer is already hardened due to the sintering and the force necessary for cutting is also large. Thus, the porous protection layer may be broken.

Meanwhile, the porous protection layer can be formed by a spray method. However, this method has a problem in that: forming a porous protection layer having a uniform thickness requires skill; the attachment rate is low; and the cost is increased.

SUMMARY OF THE INVENTION

It is therefore an object of the present invention to provide: a method for producing a gas sensor element in which an inner protection layer and an outer protection layer can be formed by a dip method in a simple manner, and in which nonuniformity in the thickness of the layer due to the dip method is reduced; the gas sensor element; and a gas sensor including the gas sensor element.

The above object has been achieved by providing (1) a method for producing a gas sensor element extending in a direction of an axial line thereof and having a detection portion disposed on a front end side thereof, the detection portion being covered by, as a porous protection layer, an inner protection layer that is porous and an outer protection layer that is porous and that has a porosity different from a porosity of the inner protection layer, in this order. The method comprises: a first dipping step of dipping the front end side of the gas sensor element into a first slurry for the inner protection layer, to form a first coating film made of the first slurry on a front end surface and a peripheral surface of the gas sensor element; a drying step of drying and solidifying the first coating film; a second dipping step of dipping, without removing the first coating film, the front end side of the gas sensor element into a second slurry for the outer protection layer, to form a second coating film made of the second slurry on an entirety of a surface of the solidified first coating film; and a scraping-off step of performing scraping-off on the second coating film so as not to scrape-off the solidified first coating film, to remove a part of the second coating film.

According to the method (1) for producing the gas sensor element, since the inner protection layer and the outer protection layer are each formed by a dip method, skill is not required unlike a spray method, increase in cost can be suppressed, and the inner protection layer and the outer protection layer can be formed in a simple manner. In addition, since the thickness of the outer protection layer is made substantially uniform in the direction of the axial line, nonuniformity in the thickness of the layer can be reduced, and activation delay due to excessive heat capacity can also be suppressed.

The inner protection layer is left as having been formed by the dip method, and the thickness thereof in the direction of the axial line is nonuniform. However, the thickness in the direction of the axial line of the outer protection layer positioned outside the inner protection layer is made substantially uniform. Therefore, in terms of the outer shape of the porous protection layer composed of the inner protection layer and the outer protection layer, the thickness is substantially uniform. As a result, an increase in the heat capacity due to nonuniformity in the thickness of the entirety of the layer can be suppressed.

In the inner protection layer left as having been formed by the dip method, the thickness of each corner portion on the front end side is reduced. However, the thickness corresponding to the reduced amount is compensated for by the outer protection layer, and as the entirety of the porous protection layer, the thickness of the corner portion is ensured. That is, problems caused by a decrease in the thickness of the corner portion due to the dip method can also be eliminated.

Further, after the first dipping step, the first coating film is dried and solidified in the drying step. Therefore, it is possible to suppress problems such as the first coating film mixing with the second coating film, and the first coating film flowing down in the second dipping step, which may be caused when the subsequent second dipping step is performed without drying the first coating film.

If the solidified first coating film is subjected to scraping-off, the first coating film may be broken or the scraper used for scraping-off the first coating film may become deformed. Therefore, in the scraping-off step, the solidified first coating film is not subjected to scraping-off. Thus, the above problems can be avoided.

In a preferred embodiment (2) of the method (1) for producing the gas sensor element, scraping-off is performed such that a surface of the second coating film having been subjected to the scraping-off becomes a flat surface.

When scraping-off is performed in this manner, the second coating film, and consequently, the outer protection layer becomes flat (straight shape).

In another preferred embodiment (3) of the method (1) or (2) for producing the gas sensor element, the scraping-off step includes: a peripheral surface scraping-off step of scraping-off and removing a peripheral part of the second coating film; and a front end surface scraping-off step of scraping-off and removing part of a front end side of the second coating film, and the front end surface scraping-off step is performed after the peripheral surface scraping-off step.

When the peripheral surface scraping-off step is performed first, and then, the front end surface scraping-off step in which the slurry tends to drip due to gravity is performed, it is possible to suppress the scraped-off front end surface from dripping with a lapse of time after the front end surface scraping-off step, and the scraped-off shape can be maintained.

In a second aspect (4), the present invention provides a gas sensor element extending in a direction of an axial line thereof and having a plate shape that has opposing main surfaces, the gas sensor element comprises: a detection portion at a front end side thereof; and a porous protection layer configured to cover the detection portion, wherein the porous protection layer comprises an inner protection layer and an outer protection layer that is porous, the outer protection layer having a porosity different from a porosity of the inner protection layer, and that covers the inner protection layer. The inner protection layer has a maximum thickness region along the direction of the axial line, and has a reduced thickness from the region of maximum thickness toward a front end side and a rear end side of the inner protection layer. The outer protection layer has a flat front end surface and flat side surfaces, and when viewed in a direction perpendicular to the main surfaces, a rear end edge on a radially outermost side of the outer protection layer has a shape in which a center portion of the rear end edge in a width direction of the gas sensor element is recessed to the front end side with respect to a rearmost end.

According to the gas sensor element (4), since the inner protection layer and the outer protection layer are each formed by the dip method, skill is not required unlike the spray method, an increase in cost can be suppressed, and the inner protection layer and the outer protection layer can be formed in a simple manner. In addition, since the thickness of the outer protection layer is made substantially uniform in the direction of the axial line, nonuniformity in the layer thickness can be reduced, and activation delay due to excessive heat capacity can also be suppressed.

The inner protection layer is left as is as having been formed by the dip method, and the thickness thereof in the direction of the axial line is nonuniform. However, the thickness in the direction of the axial line of the outer protection layer positioned outside the inner protection layer is made substantially uniform. Therefore, in terms of the outer shape of the porous protection layer composed of the inner protection layer and the outer protection layer, the thickness is substantially uniform. As a result, increase in the heat capacity due to nonuniformity in the thickness of the entirety of the layer can be suppressed.

In the inner protection layer left as is as having been formed by the dip method, the thickness of each corner portion on the front end side is reduced. However, the thickness corresponding to the reduced amount is compensated for by the outer protection layer, and as the entirety of the porous protection layer, the thickness of the corner portion is ensured. That is, problems caused by a decrease in the thickness of the corner portion due to the dip method can also be eliminated.

When only the side surfaces of the outer protection layer are straight (flat) and the front end is not flat, it is difficult to sufficiently reduce thickness nonuniformity. Therefore, a front end surface and side surfaces that are each flat are provided.

In a third aspect (5), the present invention provides a gas sensor including the gas sensor element (4).

Effects of the Invention

According to the present invention, the inner protection layer and the outer protection layer can be formed by the dip method in a simple manner, and a gas sensor element in which the layer formed by the dip method had having a reduced thickness nonuniformity can be obtained.

DESCRIPTION OF REFERENCE NUMERALS

Figure 1:
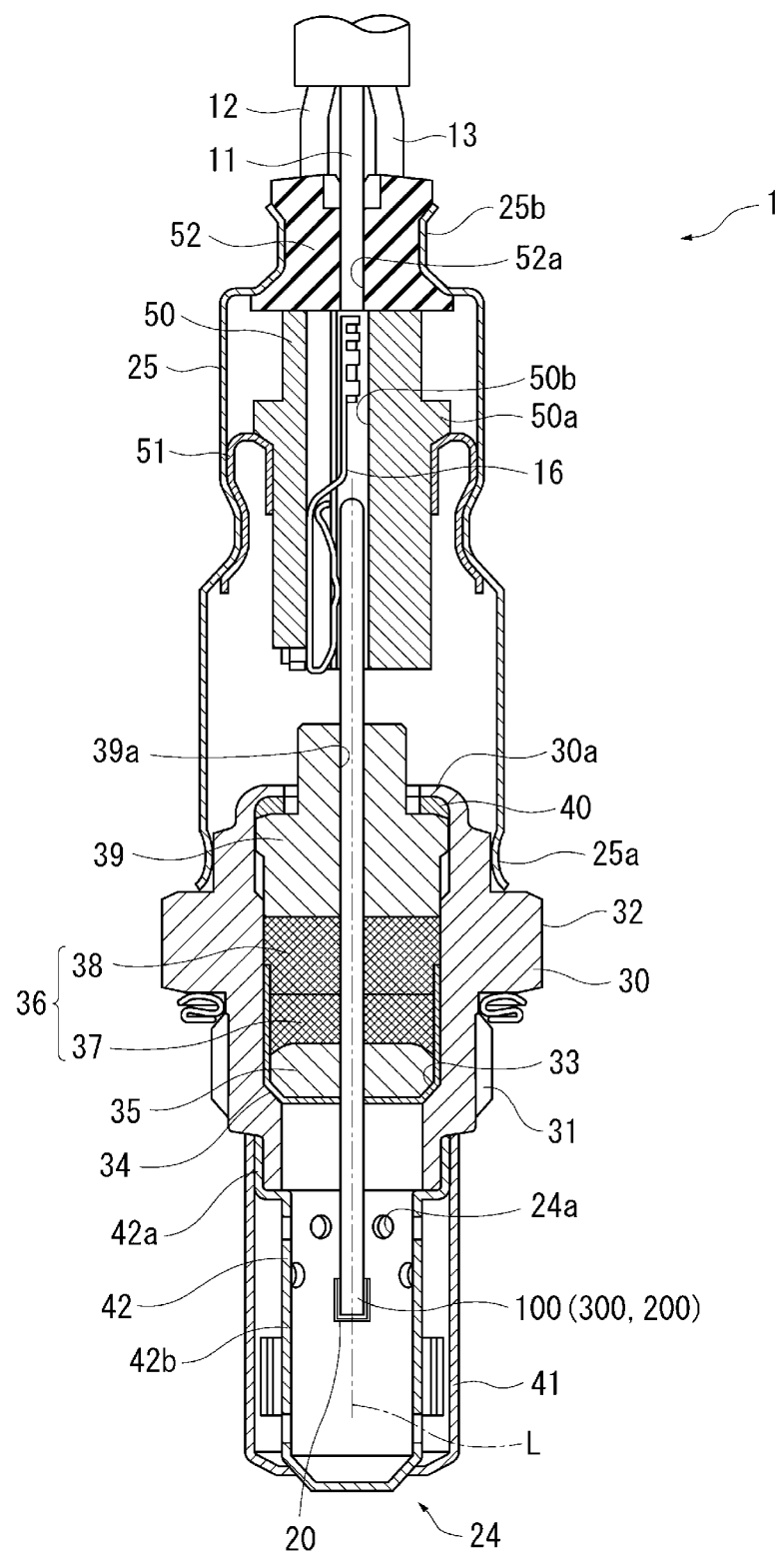
FIG. 1 is a cross-sectional view of a gas sensor cut along the direction of an axial line thereof.

Reference numerals used to identify various features in the drawings include the following.

1: gas sensor
20: porous protection layer
21: inner protection layer
22: outer protection layer
22s: side surface of the outer protection layer
22t: front end surface of the outer protection layer
22f: rear end edge on the radially outermost side of the outer protection layer
100: gas sensor element
100b: front end portion of the gas sensor element
100c: front end surface of the gas sensor element
100d: peripheral surface of the gas sensor element
101,111: main surface(protection layer and first base body)
150: detection portion
700: first coating film
800: second coating film
L: axial line
R: region where a thickness of the inner protection layer becomes maximum
P1,P2: rearmost ends of the rear end edge on a radially outermost side of the outer protection layer
S1: first slurry
S2: second slurry

DETAILED DESCRIPTION OF THE PREFERRED EMBODIMENTS

Hereinafter, various embodiments of the present invention will be described with reference to the drawings. However, the present invention should not be construed as being limited thereto.

Figure 2:
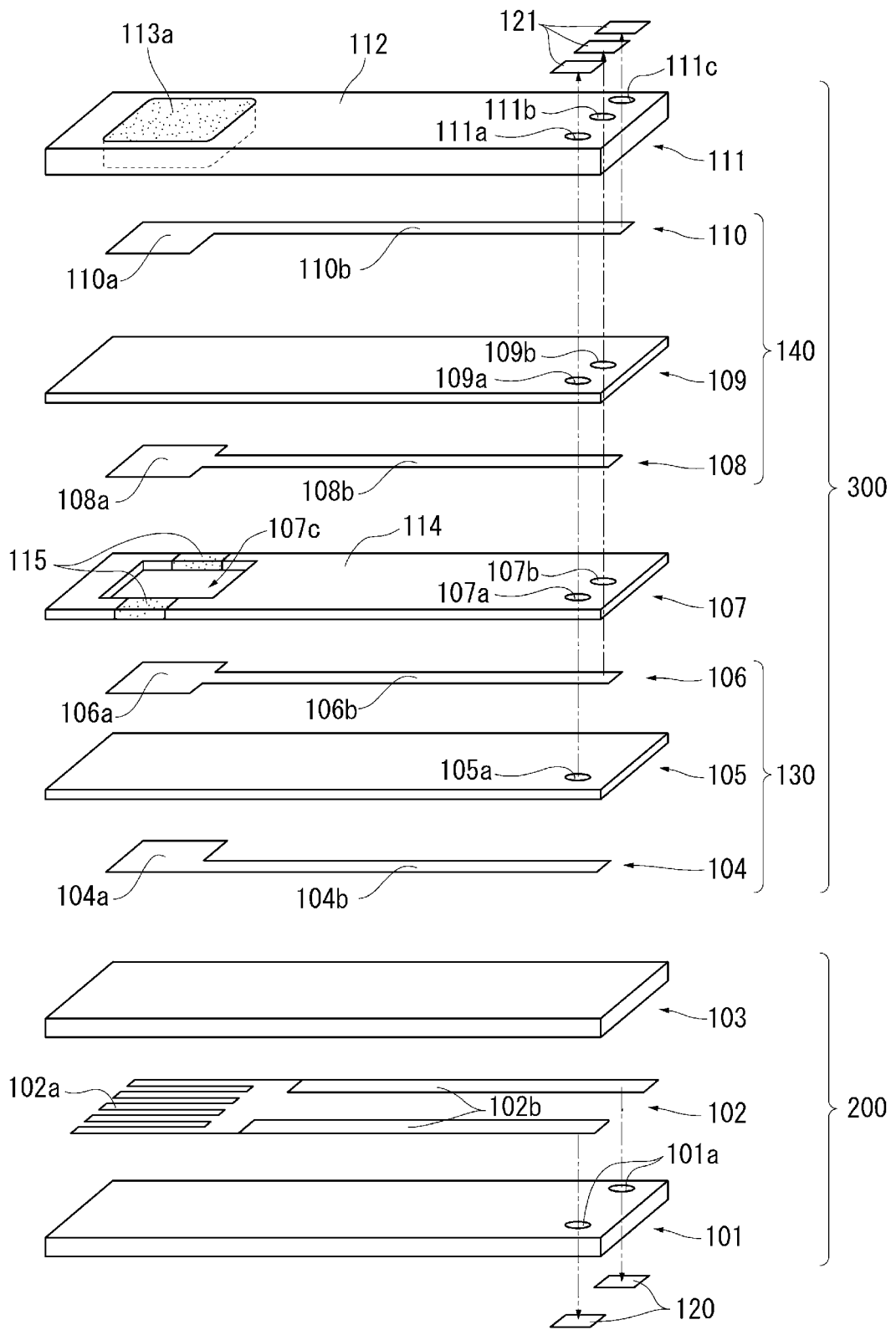
FIG. 2 is an exploded perspective view schematically showing a detection element portion and a heater portion forming a gas sensor element.

First, a configuration of a gas sensor (oxygen sensor) 1 including a gas sensor element 100 according to the present embodiment is described. FIG. 1 is a cross-sectional view of the gas sensor 1 cut along a direction of an axial line L. FIG. 2 is an exploded perspective view schematically showing a detection element portion 300 and a heater portion 200 forming the gas sensor element 100. In the present specification, the lower side of the gas sensor 1 shown in FIG. 1 will be referred to as "front end side" and the opposite side (upper side in FIG. 1) thereto will be referred to as "rear end side".

As shown in FIG. 1, the gas sensor 1 includes: the gas sensor element 100 implemented as a stacked body of the detection element portion 300 and the heater portion 200; a metal shell 30 which holds the gas sensor element 100 and the like so as to be accommodated therein; and a protector 24 that is mounted to a front end portion of the metal shell 30. The gas sensor element 100 has an elongated plate shape as a whole, and is disposed such that the longitudinal direction thereof extends along the direction of the axial line L. As described below, a porous protection layer 20 is formed on the front end side of the gas sensor element 100.

As shown in FIG. 2, the heater portion 200 has an elongated plate shape as a whole, and includes a first base body 101 and a second base body 103 which each contain alumina as a main material; and a heating element 102 which is sandwiched by the first base body 101 and the second base body 103 and which contains platinum as a main material. The heating element 102 includes: a heat generation portion 102a positioned on the front end side; and a pair of heater lead portions 102b extending from the heat generation portion 102a along the longitudinal direction (the direction of the axial line L) of the first base body 101. Ends of the heater lead portions 102b are electrically connected to heater-side pads 120, respectively, via conductors formed in heater-side through-holes 101a provided in the first base body 101.

Similar to the heater portion 200, the detection element portion 300 has an elongated plate shape as a whole, and includes an oxygen concentration detection cell 130 and an oxygen pump cell 140. The oxygen concentration detection cell 130 is composed of: a first solid electrolyte 105; and a first electrode 104 and a second electrode 106 formed at both faces of the first solid electrolyte 105. The first electrode 104 is composed of: a first electrode portion 104a; and a first lead portion 104b extending from the first electrode portion 104a along the longitudinal direction (the direction of the axial line L) of the first solid electrolyte 105. The second electrode 106 is composed of: a second electrode portion 106a; and a second lead portion 106b extending from the second electrode portion 106a along the longitudinal direction (the direction of the axial line L) of the first solid electrolyte 105.

An end of the first lead portion 104b is electrically connected to a detection-element-side pad 121 via a conductor formed in each of a first through-hole 105a provided in the first solid electrolyte 105, a second through-hole 107a provided in an insulation layer 107 described below, a fourth through-hole 109a provided in a second solid electrolyte 109, and a sixth through-hole 111a provided in a protection layer 111. An end of the second lead portion 106b is electrically connected to a detection-element-side pad 121 via a conductor formed in each of a third through-hole 107b provided in the insulation layer 107 described below, a fifth through-hole 109b provided in the second solid electrolyte 109, and a seventh through-hole 111b provided in the protection layer 111.

The oxygen pump cell 140 is composed of: the second solid electrolyte 109; and a third electrode 108 and a fourth electrode 110 formed at opposing faces of the second solid electrolyte 109. The third electrode 108 is composed of: a third electrode portion 108a; and a third lead portion 108b extending from the third electrode portion 108a along the longitudinal direction (the direction of the axial line L) of the second solid electrolyte 109. The fourth electrode 110 is composed of: a fourth electrode portion 110a; and a fourth lead portion 110b extending from the fourth electrode portion 110a along the longitudinal direction (the direction of the axial line L) of the second solid electrolyte 109.

An end of the third lead portion 108b is electrically connected to a detection-element-side pad 121 via a conductor formed in each of the fifth through-hole 109b provided in the second solid electrolyte 109 and the seventh through-hole 111b provided in the protection layer 111. An end of the fourth lead portion 110b is electrically connected to a detection-element-side pad 121 via a conductor formed in an eighth through-hole 111c provided in the protection layer 111. The second lead portion 106b and the third lead portion 108b have the same electric potential.

The first solid electrolyte 105 and the second solid electrolyte 109 are each formed from a partially stabilized zirconia sintered body obtained by adding yttria ($Y_2O_3$) or calcia (CaO) as a stabilizer to zirconia ($ZrO_2$).

The heating element 102, the first electrode 104, the second electrode 106, the third electrode 108, the fourth electrode 110, the heater-side pads 120, and the detection-element-side pads 121 can be formed from elements of the platinum group. Examples of suitable elements of the platinum group for forming these include Pt, Rh, Pd, and the like. These elements of the platinum group may be used alone or in a combination of two types or more.

Preferably, the above heating element 102 and the like are mainly formed from Pt from the viewpoints of heat resistance and oxidation resistance. In addition, preferably, the above heating element 102 and the like contain a ceramic component other than the element of the platinum group serving as a main component. To promote fixation, this ceramic component is preferably a component that is similar to the material serving as a main component on the side on which these members are stacked.

The insulation layer 107 is formed between the oxygen pump cell 140 and the oxygen concentration detection cell 130 described above. The insulation layer 107 is composed of an insulating portion 114 and a diffusion resistance portion 115. In the insulating portion 114 of the insulation layer 107, a hollow measurement chamber 107c is formed at a position corresponding to the second electrode portion 106a and the third electrode portion 108a. The measurement chamber 107c is in communication with the outside in the widthwise direction of the insulation layer 107. In each of the communicating portions, the diffusion resistance portion 115 is disposed which establishes gas diffusion between the outside and the measurement chamber 107c under a predetermined rate controlling condition.

The insulating portion 114 is not limited as long as the insulating portion 114 is a ceramic sintered body having insulating property, and is formed from an oxide-based ceramic or the like such as alumina or mullite, for example.

The diffusion resistance portion 115 is a porous body formed from alumina, and the speed of a detection gas flowing into the measurement chamber 107c is adjusted by the diffusion resistance portion 115 formed as a porous body.

At a surface of the second solid electrolyte 109, the protection layer 111 is formed so as to sandwich the fourth electrode 110 therebetween. The protection layer 111 is composed of: a porous electrode protection portion 113a for preventing the fourth electrode portion 110a from being poisoned, in such a manner that the fourth electrode portion 110a is sandwiched; and a reinforcing portion 112 for protecting the second solid electrolyte 109 in such a manner that the fourth lead portion 110b is sandwiched. The gas sensor element 100 of the present embodiment is an oxygen sensor element in which: the direction and magnitude of the current flowing between the electrodes of the oxygen pump cell 140 are adjusted such that the voltage (electromotive force) generated between the electrodes of the oxygen concentration detection cell 130 has a predetermined value (e.g., 450 mV); and the oxygen concentration in the measurement target gas corresponding to the current flowing in the oxygen pump cell 140 is linearly detected.

Here, the protection layer 111 and the first base body 101 shown in FIG. 2 correspond to "opposing main surfaces" of the invention. That is, a cross section of the gas sensor element 100 perpendicular to the direction of the axial line L is a cross section having a rectangular shape, the long sides of which are the outer edges formed by the protection layer 111 and the first base body 101, and the short sides of which are two sides along the stacking direction of the protection layer 111 and the first base body 101.

With reference back to FIG. 1, the metal shell 30 is made of SUS430, and includes: an external thread portion 31 for attaching the gas sensor 1 to an exhaust pipe; and a hexagonal portion 32 at which an attachment tool is applied at the time of the attachment. In addition, the metal shell 30 is provided with a metal-shell-side step portion 33 protruding toward the radially inner side. The metal-shell-side step portion 33 supports a metal holder 34 for holding the gas sensor element 100. On the inner side of the metal holder 34, a ceramic holder 35 and a talc 36 are disposed in this order from the front end side.

The talc 36 is composed of a first talc 37 disposed in the metal holder 34, and a second talc 38 disposed at the rear end of the metal holder 34. The first talc 37 is filled and compressed in the metal holder 34, whereby the gas sensor element 100 is fixed with respect to the metal holder 34. In addition, the second talc 38 is filled and compressed in the metal shell 30, whereby sealability between the outer surface of the gas sensor element 100 and the inner surface of the metal shell 30 is ensured.

A sleeve 39 made of alumina is disposed on the rear end side of the second talc 38. The sleeve 39 is formed in a multi-stepped cylindrical shape, and an axial hole 39a is provided so as to extend along the axial line L. The gas sensor element 100 is inserted into the sleeve 39 including the axial hole 39a. A crimping portion 30a on the rear end side of the metal shell 30 is bent inwardly, and the sleeve 39 is pressed by the crimping portion 30a toward the front end side of the metal shell 30 via a stainless steel ring member 40.

A protector 24 made of metal is attached by welding to the outer periphery on the front end side of the metal shell 30. The protector 24 has a double structure. On the outer side of the protector 24, an outer protector 41 is disposed in a bottomed cylindrical shape having a uniform outer diameter. On the inner side of the protector 24, an inner protector 42 is disposed in a bottomed cylindrical shape formed such that the outer diameter of a rear end portion 42a is larger than the outer diameter of a front end portion 42b. The protector 24 covers a front end portion, of the gas sensor element 100, protruding from the front end of the metal shell 30, and has a plurality of gas introduction holes 24a.

The rear end side of the metal shell 30 is inserted in the front end side of an outer casing 25 made of SUS430. The outer casing 25 includes a front end portion 25a of which the front end side has an enlarged diameter. The front end portion 25a is fixed to the metal shell 30 by laser welding or the like. A separator 50 is disposed in the inside on the rear end side of the outer casing 25. A holding member 51 is interposed in a gap formed between the separator 50 and the outer casing 25. The holding member 51 is engaged with a protruding portion 50a protruding outward from the peripheral surface of the separator 50, and is fixed between the separator 50 and the crimped outer casing 25.

The separator 50 is provided with insertion holes 50b for inserting various types of lead wires 11, 12, 13 for the detection element portion 300 and for the heater portion 200 such that the insertion holes 50b penetrate the separator 50 from the front end side to the rear end side. In FIG. 1, for convenience of description, only three lead wires 11, 12, 13 are shown, and the other lead wires are not shown. Connection terminals 16 which connect the above lead wire 11, etc., and the detection-element-side pads 121 of the detection element portion 300 and the heater-side pads 120 of the heater portion 200 are accommodated in the insertion hole 50b. Each lead wire 11, etc., is configured to be externally connectable to a connector (not shown), and input/output of an electric signal is performed between an external device such as an ECU and each lead wire 11, etc., via the connector.

Further, a rubber cap 52 having a substantially circular column shape and for closing an opening 25b on the rear end side of the outer casing 25 is disposed on the rear end side of the separator 50. The rubber cap 52 is fixed to the outer casing 25, by the outer casing 25 being crimped toward the radially inner side in a state where the rubber cap 52 is accommodated in the rear end of the outer casing 25. The rubber cap 52 is also provided with insertion holes 52a for respectively inserting the lead wire 11 and the like such that the insertion holes 52a penetrate the rubber cap 52 from the front end side to the rear end side.

Next, the porous protection layer 20 is described with reference to FIGS. 3 to 6. In the present invention, the porous protection layer 20 includes an inner protection layer 21 and an outer protection layer 22 covering the inner protection layer 21. The inner protection layer 21 and the outer protection layer 22 are each porous and have different porosities.

In the present embodiment, the porosity of the inner protection layer 21 is set to be greater than the porosity of the outer protection layer 22. Therefore, when the porous protection layer 20 is subjected to water from the outside, permeation of water from the outer protection layer 22 to the inner protection layer 21 can be suppressed by capillary action, thus improving water resistance.

It is not essential to set the porosity of the inner protection layer 21 greater than that the porosity of the outer protection layer 22. For certain applications, the porosity of the inner protection layer 21 may be set to be smaller than that of the porosity of the outer protection layer 22.

Figure 3:
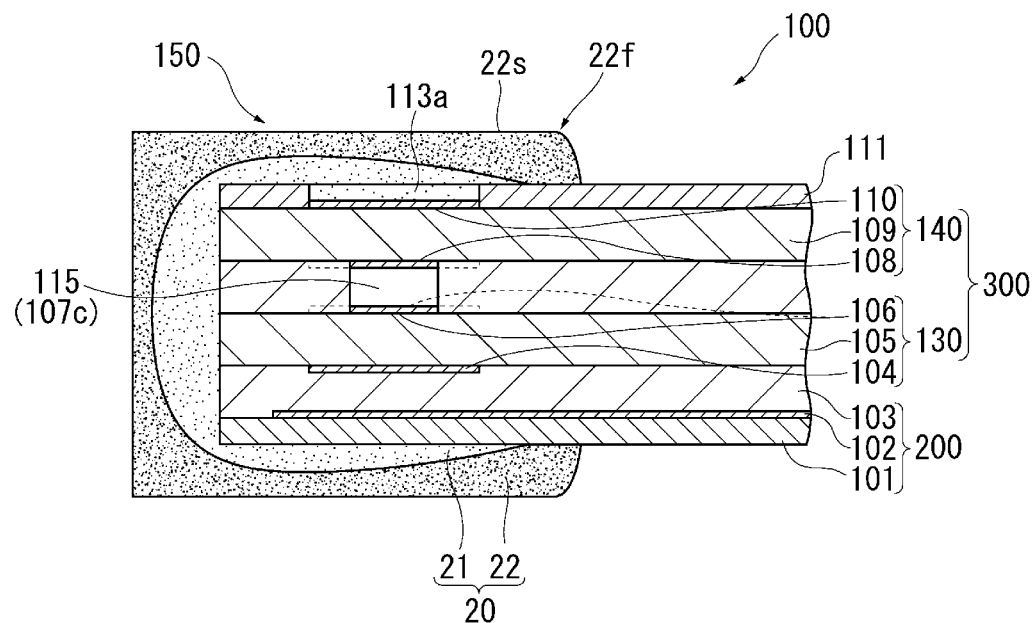
FIG. 3 is a cross-sectional view schematically showing the configuration of a front end side of the gas sensor element cut along the direction of the axial line.
Figure 4:
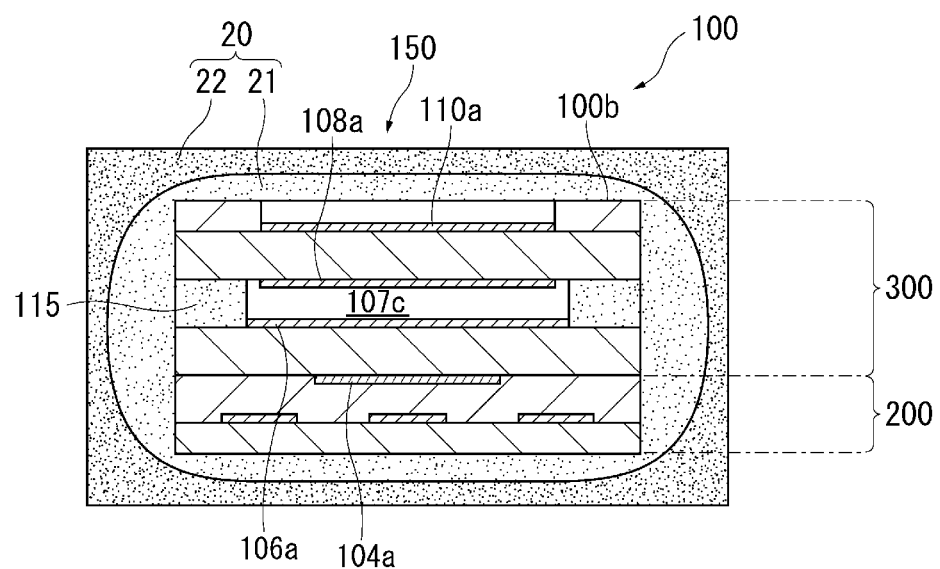
FIG. 4 is a cross-sectional view schematically showing the configuration of the front end side of the gas sensor element cut along a direction orthogonal to the direction of the axial line.

FIG. 3 is a cross-sectional view schematically showing the configuration of the front end side of the gas sensor element 100 cut along the direction of the axial line L. FIG. 4 is a cross-sectional view schematically showing the configuration of the front end side of the gas sensor element 100 cut along a direction orthogonal to the direction of the axial line L. As shown in FIGS. 3 and 4, the porous protection layer 20 (the inner protection layer 21 and the outer protection layer 22) are formed on the front end side of the gas sensor element 100. In the present specification, the gas sensor element 100 in a state where the porous protection layer 20 is not formed may be particularly referred to as "gas sensor element body 100a".

A front end portion 100b of the gas sensor element body 100a is provided with a detection portion 150 for detecting a specific component (oxygen or the like) contained in exhaust gas. The detection portion 150 is mainly composed of the electrode portions (the first electrode portion 104a, the second electrode portion 106a, the third electrode portion 108a, and the fourth electrode portion 110a) and the measurement chamber 107c of the detection element portion 300. The porous protection layer 20 is formed at the front end portion 100b of the gas sensor element body 100a so as to cover the periphery of the detection portion 150. Pores having a three-dimensional network structure are formed in the porous protection layer 20 (the inner protection layer 21 and the outer protection layer 22) so as to allow gas permeation.

Figure 5:
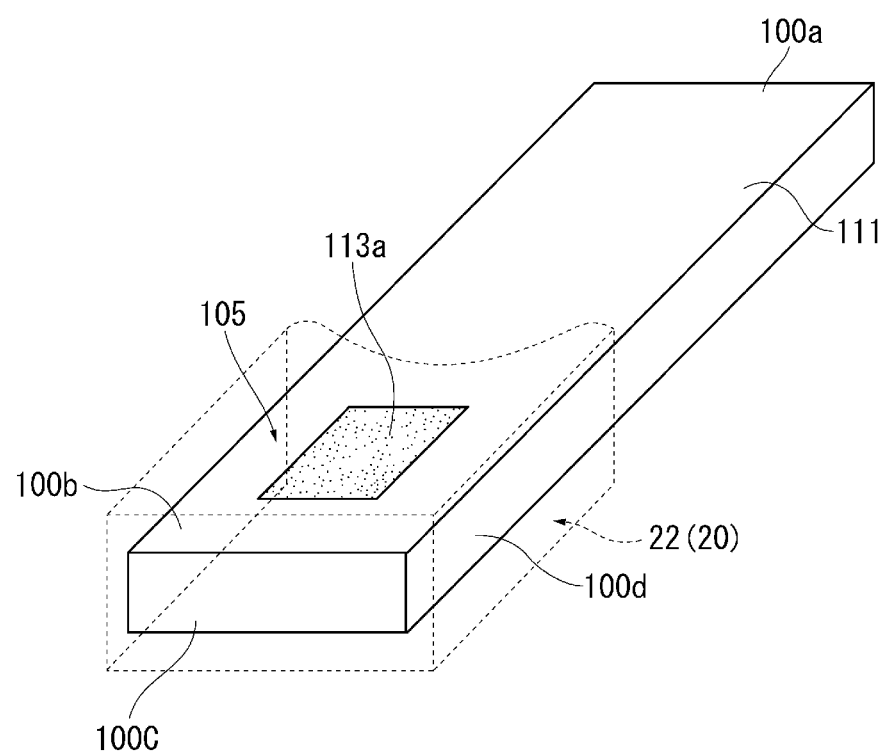
FIG. 5 is a perspective view of a gas sensor element body viewed from the front end side.

FIG. 5 is a perspective view of the gas sensor element body 100a viewed from the front end side. For convenience of description, in FIG. 5, the outer protection layer 22 (the porous protection layer 20) is virtually depicted. The outer protection layer 22 (the porous protection layer 20) is formed at the front end portion 100b of the gas sensor element body 100a so as to cover a front end surface 100c and a peripheral surface 100d of the front end portion 100b of the gas sensor element body 100a.

The inner protection layer 21 and the outer protection layer 22 forming the porous protection layer 20 can be formed by binding, through sintering or the like, one or more types of ceramic particles selected from the group consisting of titania, alumina, spinel, zirconia, mullite, zircon, and cordierite, for example. By sintering a slurry containing these particles, it is possible to form pores between the ceramic particles. A burn-out-type pore-forming material formed from carbon, resin beads, an organic or inorganic binder, or the like may be added to the slurry containing the above particles.

When the proportion of the burn-out-type pore-forming material added to the slurry is increased, the porosity of the layer is increased. Therefore, when the proportion of the pore-forming material is adjusted, the porosities of the inner protection layer 21 and the outer protection layer 22 can be changed.

Next, a characteristic part of the gas sensor element 100 according to the embodiment of the present invention is described with reference to FIG. 6.

Figure 6:
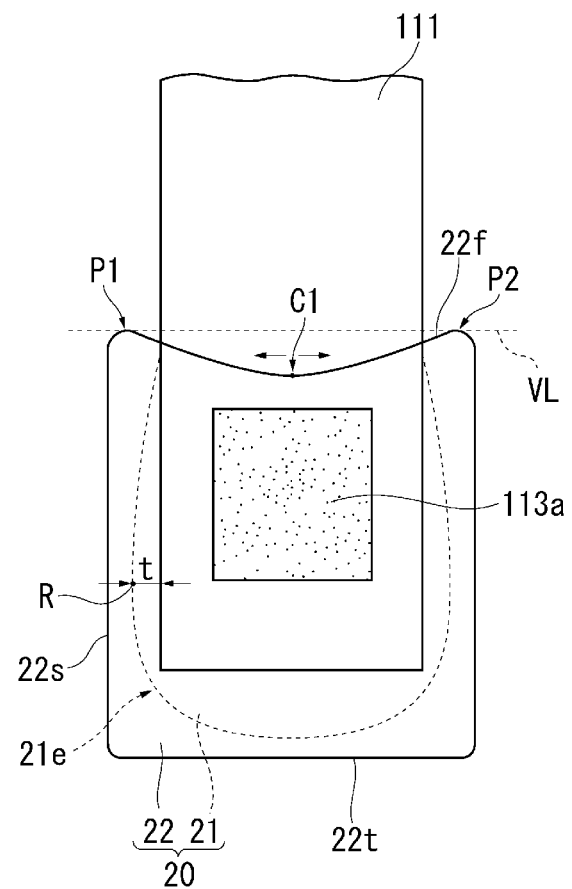
FIG. 6 is a front view showing the shape of an outer protection layer viewed from a direction perpendicular to a main surface of the gas sensor element.

As shown in FIG. 6, when viewed from a direction perpendicular to the main surface (the protection layer 111), the inner protection layer 21 has a region R where a thickness t becomes maximum along the direction of the axial line L, and has a reduced thickness from the region R toward the front end side and the rear end side, respectively.

Meanwhile, the outer protection layer 22 has a front end surface 22t and four side surfaces 22s, and the front end surface and the side surfaces are each a flat surface. Each side surface 22s has a straight shape (substantially parallel to the direction of the axial line L), and a rear end edge 22f on the radially outermost side of the outer protection layer 22 has a shape in which a center portion of the rear end edge 22f in the width direction of the gas sensor element 100 is recessed to the front end side with respect to rearmost ends P1, P2. In other words, the rear end edge 22f is shaped so as to be recessed to the front end side from the rearmost ends P1, P2 toward the center of the portion between P1 and P2. In addition, the surface of the portions (portions that cover corners of the sensor element), of the outer protection layer 22, at which the front end surface 22t and the side surfaces 22s are connected to each other are curved surfaces, although not shown.

Here, as shown in FIG. 3, which is a cross-sectional view from a direction perpendicular to that in FIG. 6 (i.e., a direction parallel to the main surface), the "rear end edge 22f" is defined as the rear end edge at each side surface 22s of the outer protection layer 22 (i.e., on the radially outermost side). This is because, as shown in FIG. 3, since the rearward facing surface of the outer protection layer 22 is inclined, the shape of the rear end edge also varies according to the position in the thickness direction of the outer protection layer 22.

"The rear end edge 22f is recessed to the front end side from the rearmost ends P1, P2 toward the center of the portion between P1 and P2," means that at any position C1 in the region between the rearmost ends P1, P2 in the width direction of the gas sensor element 100, the rear end edge 22f is positioned on the front end side with respect to a virtual line VL connecting the rearmost ends P1, P2 in FIG. 6.

First, that "the inner protection layer 21 has a reduced thickness from the region R toward the front end side and the rear end side" indicates that the inner protection layer 21 has been formed by a dip method, and accordingly, the thickness on the front end side and the rear end side (particularly, the thickness at the corner portions 21e on the front end side) is reduced due to the flow of the slurry.

The expression "the rear end edge 22f is recessed to the front end side from the rearmost ends P1, P2 toward the center," indicates that the outer protection layer 22 has also been formed by a dip method, and accordingly, when the gas sensor element 100 has been dipped in the slurry, the slurry has attached in a shape where the center portion thereof is recessed due to frictional force between the slurry and the surface of the gas sensor element 100.

Meanwhile, the expressions "the front end surface and the side surfaces are each a flat surface", and "each side surface 22s has a straight shape" indicate the following. That is, in the case of an ordinary dip method, similar to the inner protection layer 21, the outer protection layer 22 also has a maximum thickness region along the direction of the axial line L. However, thick portions are corrected by a production method described below, to realize the flat surfaces and a substantially uniform thickness along the direction of the axial line L.

As described above, in the gas sensor element 100 according to the embodiment of the present invention, since the inner protection layer 21 and the outer protection layer 22 are each formed by a dip method, skill is not required unlike a spray method, increase in cost can be suppressed, and the inner protection layer 21 and the outer protection layer 22 can be formed in a simple manner. In addition, since the thickness of the outer protection layer 22 is made substantially uniform in the direction of the axial line L, nonuniformity in the thickness of the layer can be reduced, and activation delay due to excessive heat capacity can also be suppressed.

The inner protection layer 21 is left as is as having been formed by a dip method and the thickness thereof in the direction of the axial line L is nonuniform. However, the thickness in the direction of the axial line L of the outer protection layer 22 positioned outside the inner protection layer 21 is made substantially uniform. Therefore, in terms of the outer shape of the porous protection layer 20 composed of the inner protection layer 21 and the outer protection layer 22, the thickness is substantially uniform. As a result, an increase in heat capacity due to nonuniformity in the thickness of the entirety of the layer can be suppressed.

As shown in FIG. 6, in the inner protection layer 21 left as is as having been formed by the dip method, the thickness of each corner portion 21e on the front end side is reduced. However, the thickness corresponding to the reduced amount is compensated for by the outer protection layer 22, and as the entirety of the porous protection layer 20, the thickness of the corner portion is ensured. That is, problems caused by a decrease in the thickness of the corner portion 21e due to the dip method can also be eliminated.

The gas sensor element 100 is used in the gas sensor 1 described above.

Next, a method for producing the gas sensor element according to the embodiment of the present invention is described. The method for producing the gas sensor element of the present embodiment includes a first dipping step, a drying step, a second dipping step, and a scraping-off step.

The first dipping step is a step of dipping the front end side of the gas sensor element body 100a (the gas sensor element 100) into a slurry (hereinafter, simply referred to as a "slurry") S1 for forming the inner protection layer 21, thereby forming a first coating film 700 made of the slurry S1 on the front end surface 100c and the peripheral surface 100d of the front end portion 100b of the gas sensor element body 100a.

It should be noted that a slurry, for forming the outer protection layer 22, to be used in the second dipping step described below is referred to as a "slurry S2".

The slurry S1, S2 is a solution that contains one or more types of ceramic particles selected from the group consisting of, for example, titania, alumina, spinel, zirconia, mullite, zircon, and cordierite, similar to those conventionally used in this type of dipping step. However, compared with those conventionally used, the viscosity of the slurry S1, S2 when the shear rate is 0.1 s$^{-1}$ is preferably set to be high, and the viscosity of the slurry S1, S2 when the shear rate is 10 s$^{-1}$ is preferably set to be low.

For example, under a condition of room temperature (23° C.), the viscosity (mPa·s) of the slurry S1, S2 is preferably set to be not less than 43000 mPa·s when the shear rate is 0.1 s$^{-1}$, and is preferably set to be not greater than 2500 mPa·s when the shear rate is 10 s$^{-1}$.

The viscosity of the slurry S1, S2 is not limited in particular as long as the object of the present invention is not impaired. However, for example, under a condition of room temperature (23° C.), the viscosity of the slurry S1, S2 is set to be 65000 mPa·s when the shear rate is 0.1 s$^{-1}$, and is set to be 2400 mPa·s when the shear rate is 10 s$^{-1}$. When the viscosity of the slurry S1, S2 is set as above, the thickness of a coating film 700 made of a slurry S and formed on the gas sensor element body 100a can be easily adjusted in the scraping-off step described below. It should be noted that the viscosity of the slurry S1, S2 is adjusted as appropriate by adding, for example, a synthetic resin, an organic binder formed from a naturally-occurring polymer etc., an alumina sol, water, or the like, to the slurry S1, S2. The viscosity of the slurry S is measured using a viscometer (Rheometer MCR102: manufactured by Anton-Paar).

Here, a preparation example of slurries used in the first and second dipping steps is described. A titania powder, a spinel powder, an alumina sol, an organic binder (e.g., acrylic copolymer), a dispersant (e.g., anionic polymer dispersant), a defoaming agent (e.g., amide wax-based defoaming agent), and water are blended at respective predetermined proportions and mixed for a predetermined time, to obtain a target slurry.

Figure 7:
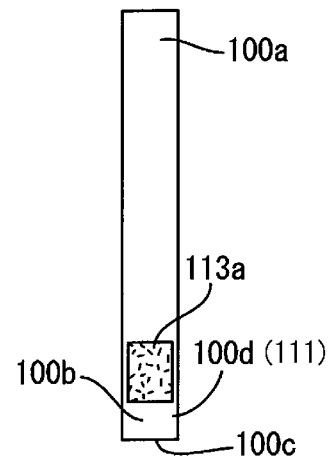
FIG. 7 is an explanatory diagram showing a state in which the gas sensor element body is on standby above a dipping chamber in a first dipping step.
Figure 7:
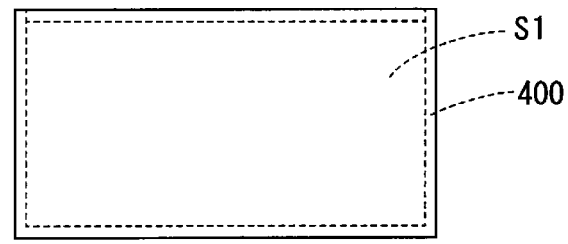

FIG. 7 illustrates a state where, in the first dipping step, the gas sensor element body 100a is on standby above a dipping chamber 400. FIG. 7 shows a state of the gas sensor element body 100a and the like before the dipping step is started. In FIG. 7, the container-like dipping chamber 400 storing the slurry S1 and open at the upper side, and the gas sensor element body 100a on standby in a state of resting above the dipping chamber 400 are shown.

The gas sensor element body 100a is fixed using a predetermined jig such that the longitudinal direction of the gas sensor element body 100a extends along the vertical direction and the front end portion 100b faces downward. The front end portion 100b of the gas sensor element body 100a is in a state of opposing the slurry S1 stored in the dipping chamber 400. In FIG. 7, out of the surfaces of the gas sensor element body 100a, the surface (the main surface which is the protection layer 111) that is on the side where the electrode protection portion 113a is formed is shown so as to face the viewer of the drawing sheet.

As shown in FIG. 7, the position at which the gas sensor element body 100a is on standby while resting above the dipping chamber 400 is referred to as a "stand-by position".

The gas sensor element body 100a is configured to be able to reciprocate, in a state of being fixed to the predetermined jig, between the stand-by position and a position (dipping position described hereinafter) therebelow on the inner side of the dipping chamber 400, along the up-down direction (vertical direction). The mechanism for reciprocating the gas sensor element body 100a is not limited in particular as long as the object of the present invention is not impaired, and a known reciprocation mechanism using a servomotor or the like is applied.

In the first dipping step, a state where the front end portion 100b of the gas sensor element body 100a lowered from the stand-by position is dipped in the slurry in the dipping chamber 400 is established.

The height position of the front end portion 100b dipped in the slurry is set such that the front end portion 100b does not contact the bottom of the dipping chamber 400 and the slurry S1 evenly attaches to the front end surface 100c and the peripheral surface 100d of the front end portion 100b.

Figure 12:
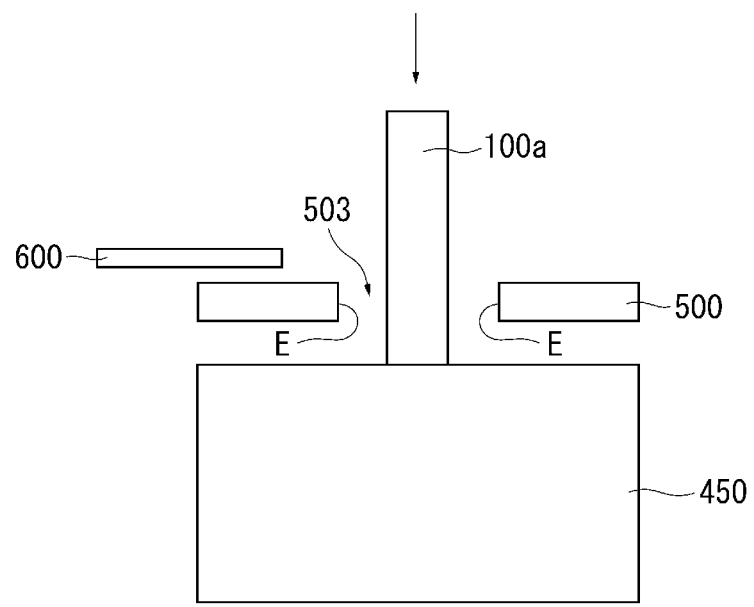
FIG. 12 is an explanatory diagram showing a state in which, in the first and second dipping steps, a front end portion of the gas sensor element body lowered from a stand-by position is dipped in a slurry in the dipping chamber.

The position of the gas sensor element body 100a dipped in the slurry such that the slurry attaches to the front end surface 100c and the peripheral surface 100d is referred to as a "dipping position" (see FIG. 12 showing the second dipping step described below). The gas sensor element body 100a may be allowed to rest at the dipping position for a predetermined time as necessary, or may be immediately pulled up after reaching the dipping position.

Figure 8:
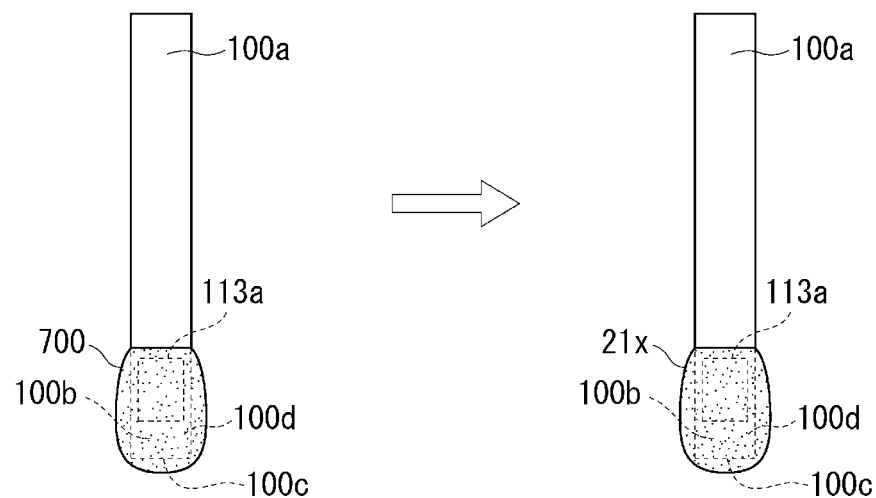
FIG. 8 is a diagram showing a drying step of drying and solidifying a first coating film to form an unsintered inner protection layer.

As shown in FIG. 8, through the first dipping step, the front end portion 100b of the gas sensor element body 100a is dipped into the slurry S1, whereby the first coating film 700 made of the slurry S1 is formed on the front end surface 100c and the peripheral surface 100d of the front end portion 100b. The front end portion 100b of the gas sensor element body 100a dipped in the slurry is then pulled up so as to be subjected to the next drying step.

As shown in FIG. 8, the drying step is a step of drying and solidifying the first coating film 700 to form an unsintered inner protection layer 21x. This step is performed for the following reason. If the subsequent second dipping step is performed without drying the first coating film 700, problems such as mixing of the first coating film 700 and a second coating film 800 described below, and flowing down of the first coating film 700 in the second dipping step may occur.

As for "solidifying", water need not necessarily be completely eliminated, and, in the second dipping step, the first coating film 700 only needs to be solidified to maintain the shape thereof such that the first coating film 700 does not flow down or is not mixed with the second coating film 800 (in short, a desired inner protection layer and a desired outer protection layer are respectively formed after the sintering).

After the first dipping step, the scraping-off step described below is not performed. Therefore, the first coating film 700 (and the unsintered inner protection layer 21x obtained by drying the first coating film 700) is left as is as having been formed by the dip method, and the thickness thereof in the direction of the axial line L is nonuniform. However, as already described, in terms of the outer shape of the porous protection layer 20 composed of the inner protection layer 21 and the outer protection layer 22, the thickness will be substantially uniform. Therefore, there is no problem if the thickness of the first coating film 700 is left nonuniform.

In order to ensure the thickness of the inner protection layer 21, the first dipping step and the drying step may be performed a plurality of times as necessary.

After the drying step, the next second dipping step is performed.

Figure 9:
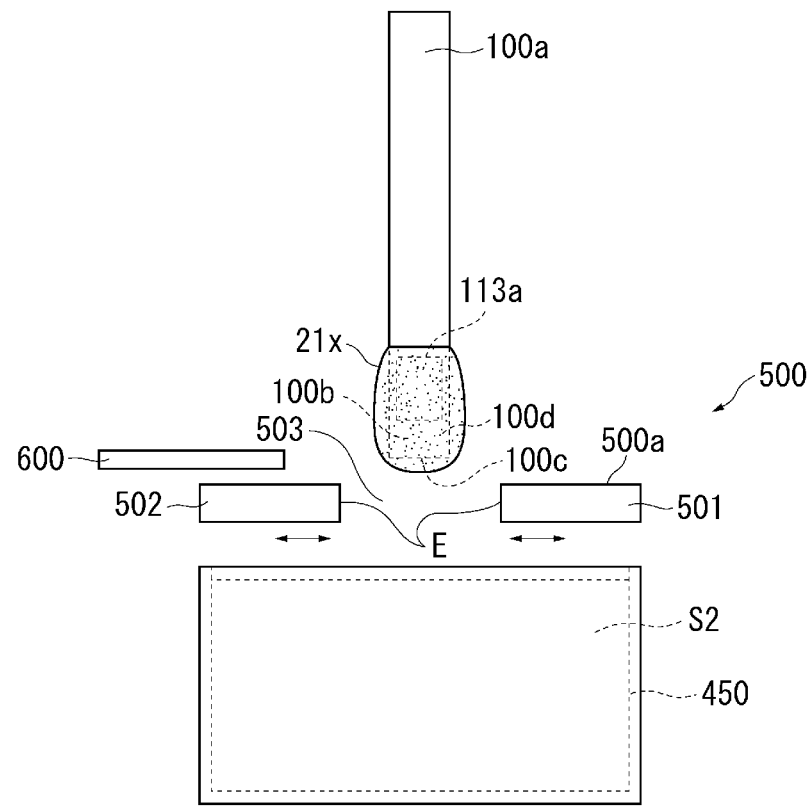
FIG. 9 is an explanatory diagram showing a state in which the gas sensor element body is on standby above a dipping chamber in a second dipping step.

FIG. 9 illustrates a state where, in the second dipping step, the gas sensor element body 100a is on standby above a dipping chamber 450. FIG. 9 shows a state where the gas sensor element body 100a and the like before the dipping step is started. In FIG. 9, the container-like dipping chamber 450 storing the slurry S2 and open at the upper side, and the gas sensor element body 100a on standby at the "stand-by position" while resting above the dipping chamber 450 are shown.

The disposition state of the gas sensor element body 100a at the "stand-by position" is the same as that in the first dipping step in FIG. 7. At the front end portion 100b of the gas sensor element body 100a, the unsintered inner protection layer 21x has been formed by the first dipping step and the drying step.

As shown in FIG. 9, a scraper 500 and a scrape-off blade 600 to be used in the scraping-off step, which is performed after the dipping step, are disposed between the gas sensor element body 100a at the stand-by position and the dipping chamber 450.

Figure 10:
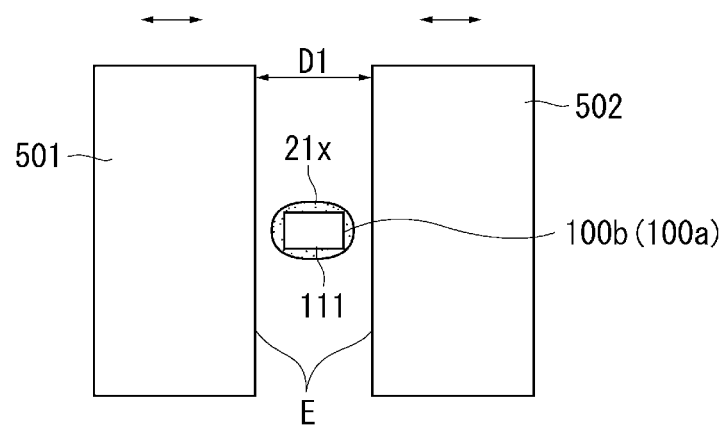
FIG. 10 is a plan view of a scraper.

FIG. 10 is a plan view of the scraper 500. The scraper 500 includes: a pair of movable blades 501, 502 arranged so as to be separated from each other in the horizontal direction; and a movement mechanism (a servomotor and an actuator such as a feed screw) for moving each movable blade 501, 502.

The movable blades 501, 502 each have a substantially rectangular shape, and opposing sides E, E thereof are parallel to each other and separated from each other by a predetermined interval D1 to form an opening (gap) 503. The size (the interval D1) of the opening 503 is set so as to allow the gas sensor element body 100a to pass between the sides E, E at the edge portion of the opening 503.

At the stand-by position, in a plan view, the front end portion 100b of the gas sensor element body 100a is disposed so as to be within the inner side of the opening 503. In FIG. 10, in plan view, the front end portion 100b of the gas sensor element body 100a in a state of being within the inner side of the opening 503 is depicted virtually.

The pair of sides E, E forming the peripheral edge of the opening 503 function as scrape-off blades, and excesses of the second coating film 800 that are on the movable blades 501, 502 sides with respect to the sides E, E are scraped-off by the sides E, E when passing through the opening 503, whereby the thickness (width) of the second coating film 800 is adjusted to the interval D1.

It should be noted that, in the case of FIG. 10, only the thickness (width) of the second coating film 800 in a direction parallel to the protection layer 111 (main surface) is adjusted to the interval D1.

Figure 11:
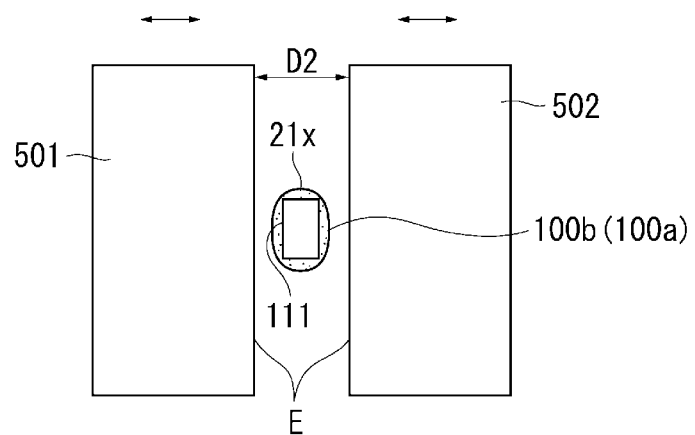
FIG. 11 is a plan view of the scraper in a state in which the gas sensor element is rotated by 90 degrees and the interval is further narrowed.

Therefore, although details are described below, as shown in FIG. 11, the gas sensor element body 100a (and the front end portion 100b) is rotated by 90 degrees (in FIG. 11, counterclockwise), and the interval is further narrowed to an interval D2, whereby the thickness (width) of the second coating film 800 extending in a direction perpendicular to the protection layer 111 (main surface) can be adjusted to the interval D2.

Figure 15:
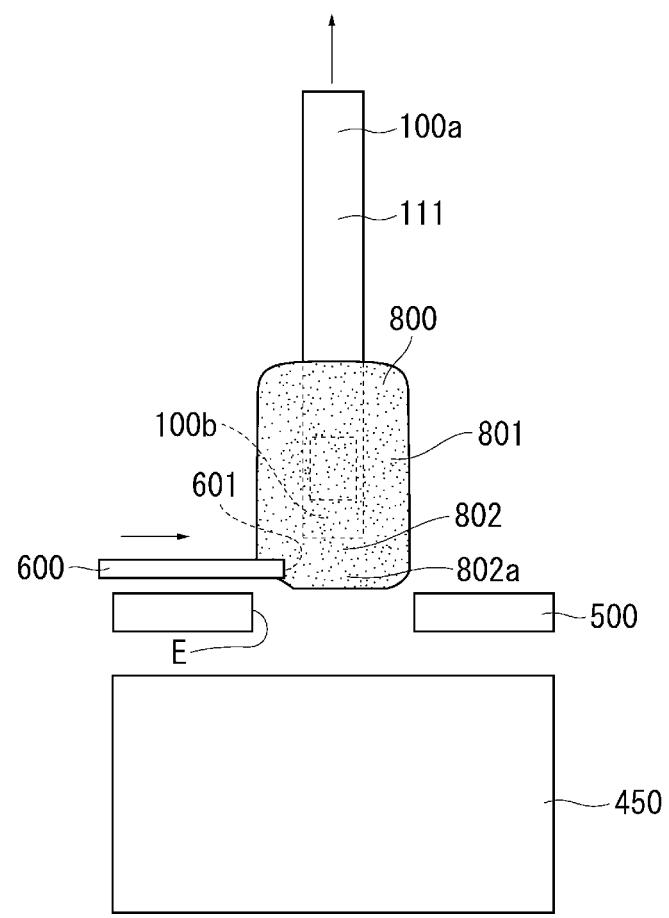
FIG. 15 is an explanatory diagram showing how, in the scraping-off step, a part (excess coating film) of a front end coating film formed on the front end surface of the front end portion of the gas sensor element body is removed using a scrape-off blade.

It should be noted that the scraping-off on the main surface side of the front end portion 100b shown in FIG. 11 may be performed prior to the scraping-off shown in FIG. 10, or the scraping-off on the front end shown in FIG. 15 may be performed prior to the scraping-off shown in FIG. 11 and FIG. 10.

As shown in FIG. 9, the scrape-off blade 600 is withdrawn to a position on the outer side with respect to the opening 503 such that the scrape-off blade 600 does not overlap the opening 503 in the up-down direction, and this position is referred to as a "withdrawn position" of the scrape-off blade 600.

In the case of the present embodiment, the scrape-off blade 600 is disposed on an upper surface 500a side of the scraper 500. The scrape-off blade 600 is disposed at a height position that allows the formation of a gap between the scrape-off blade 600 and the upper surface 500a of the scraper 500.

FIG. 12 illustrates a state where, in the dipping step, the front end portion 100b of the gas sensor element body 100a lowered from the stand-by position is dipped in the slurry S2 in the dipping chamber 450. When the gas sensor element body 100a (see FIG. 7) standing by at the stand-by position is moved downwardly, the front end portion 100b passes through the opening 503 of the scraper 500 from the upper side to the lower side. At this time, the front end portion 100b passes through the opening 503 without contacting the scraper 500. Then, the gas sensor element body 100a is further moved downwardly, and the front end portion 100b is dipped into the slurry stored in the dipping chamber 450.

The height position of the front end portion 100b dipped in the slurry is set such that the front end portion 100b does not contact the bottom of the dipping chamber 450 and the slurry evenly attaches to the front end surface 100c and the peripheral surface 100d of the front end portion 100b.

The position of the gas sensor element body 100a dipped in the slurry, as shown in FIG. 12, such that the slurry attaches to the front end surface 100c and the peripheral surface 100d is referred to as the "dipping position" (which is common between the first dipping step and the second dipping step). The gas sensor element body 100a may be allowed to rest at the dipping position for a predetermined time as necessary, or may be immediately pulled up after reaching the dipping position.

Through the dipping steps as described above, the front end portion 100b of the gas sensor element body 100a is dipped in the slurry, whereby the coating films 700, 800 made of the slurry can be formed on the front end surface 100c and the peripheral surface 100d of the front end portion 100b (the first dipping step and the second dipping step). Thereafter, the front end portion 100b of the gas sensor element body 100a dipped in the slurry is pulled up, and then, in the case of the first dipping step, is subjected to the drying step, and, in the case of the second dipping step, is subjected to the scraping-off step.

The scraping-off step is a step of performing scraping-off on the coating film 800 made of the slurry S2 obtained in the second dipping step and attached to the front end portion 100b of the gas sensor element body 100a, to thereby remove a part of the coating film 800. As in FIG. 10 and FIG. 11 described above, after the second dipping step, when the front end portion 100b of the gas sensor element body 100a is pulled up from the slurry S2, the coating film 800, which is the attached slurry, is formed on the front end portion 100b. Then, after the second dipping step, when the thickness of the coating film 800 formed on the front end portion 100b exceeds the thickness necessary for the porous protection layer 20, the coating film corresponding to the exceeding amount is removed in the scraping-off step.

In the present specification, the thickness of the coating film 800 necessary for the porous protection layer 20 is referred to as a "necessary thickness".

In the present specification, with respect to the coating film 800 attached to the front end portion 100b after the dipping step, a coating film formed on the peripheral surface 100d of the front end portion 100b is referred to as a "peripheral surface coating film 801", and a coating film formed on the front end surface 100c of the front end portion 100b is referred to as a "front end coating film 802". In the present specification, in the axial direction (the direction of the axial line L), a coating film present on the front side with respect to the front end surface 100c of the front end portion 100b is defined as the front end coating film 802.

The scraping-off step of the present embodiment includes: a step (peripheral surface scraping-off step) of removing, using the scraper 500, a part (excess coating film) 801a of the peripheral surface coating film 801, of the coating film 800 attached to the front end portion 100b, that is formed on the peripheral surface 100d of the front end portion 100b; and a step (front end surface scraping-off step) of removing, using the scrape-off blade 600, a part (excess coating film) 802a of the front end coating film 802 that is formed on the front end surface 100c of the front end portion 100b.

Further, of the excess coating film 801a, a coating film that has a thickness in a direction parallel to the protection layer 111 (main surface) as shown in FIG. 10 is defined as a coating film 801a1, and a coating film that has a thickness in a direction perpendicular to the protection layer 111 (main surface) as shown in FIG. 11 is defined as a coating film 801a2.

In the present embodiment, the peripheral surface scraping-off step is performed first, and then, the front end surface scraping-off step is performed. However, in consideration of dripping of the slurry due to gravity, for example, the peripheral surface scraping-off step may be performed first, and then the front end surface scraping-off step may be performed afterwards.

Figure 13:
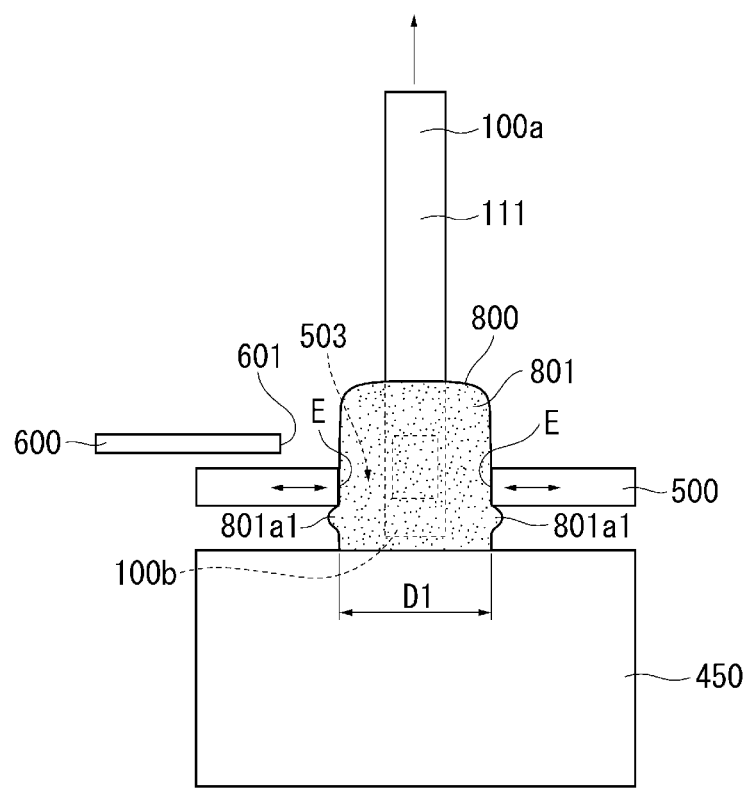
FIG. 13 is an explanatory diagram showing how, in a scraping-off step, a part (excess coating film) of a peripheral surface coating film formed on the peripheral surface of the front end portion of the gas sensor element body is removed using the scraper.

FIG. 13 illustrates how, in the scraping-off step, a part (excess coating film) 801a1 of the peripheral surface coating film 801 formed on the peripheral surface 100d of the front end portion 100b of the gas sensor element body 100a is removed using the scraper 500. In FIG. 13, details of the peripheral surface scraping-off step described above are shown. After the dipping step, when the peripheral surface coating film 801 that has a thickness exceeding the necessary thickness is attached to the front end portion 100b of the gas sensor element body 100a having been pulled up, the coating film (excess coating film) 801a1 corresponding to the exceeding amount is scraped-off by the sides E, E when the front end portion 100b passes through the opening 503 (the pair of sides E, E) of the scraper 500 from the lower side to the upper side. In this manner, when the front end portion 100b passes between the sides E, E, the excess coating film 801a1 is separated from the peripheral surface coating film 801 corresponding to the necessary thickness.

Accordingly, the thickness (width) of the second coating film 800 in a direction parallel to the protection layer 111 (main surface) is adjusted to the interval D1.

In the above embodiment, pulling up the gas sensor element body 100a realizes an operation of causing the scraper 500 to relatively move toward the front end surface 100c, and simultaneously, of causing scraping-off by means of the sides E, E to be carried out. However, conversely, for example, pulling down the gas sensor element body 100a may cause the scraper 500 to relatively move toward the rear end of the gas sensor element body 100a, and simultaneously, may cause scraping-off to be carried out. However, the above embodiment is preferable because there is no possibility that the separated excess coating film 801a1 attaches to the gas sensor element body 100a.

A part of the separated excess coating film 801a1 drops due to its weight or the like, and is returned to the dipping chamber 450. The scraper 500 is formed of a metal plate member processed in a predetermined shape, for example. The size (the interval D1) of the opening 503 of the scraper 500 is set, as described above, such that the gas sensor element body 100a can pass through the opening 503, and such that the coating film 800 (the peripheral surface coating film 801) having a thickness necessary for forming the porous protection layer 20 is formed around the front end portion 100b after the peripheral surface scraping-off step.

When the viscosity of the slurry is high, the slurry is not returned into the dipping chamber 450 and may attach to the scraper 500. In such a case, the attached slurry may be removed as appropriate.

Figure 14:
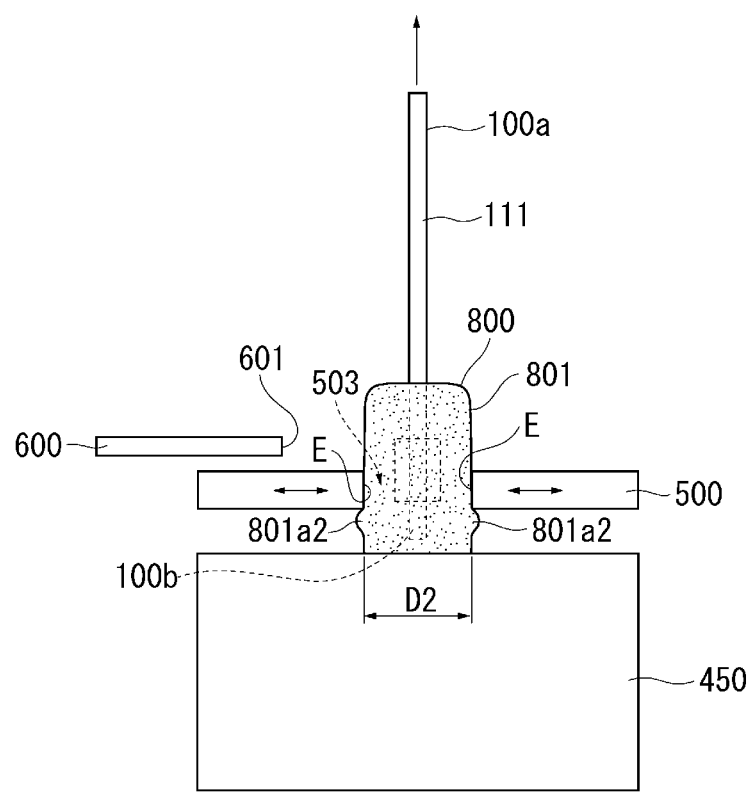
FIG. 14 is an explanatory diagram showing how, in the scraping-off step, a part (excess coating film) of the peripheral surface coating film formed on the peripheral surface when the gas sensor element body is rotated by 90 degrees is removed using the scraper.

FIG. 14 illustrates how, in the scraping-off step, a part (excess coating film) 801a2 of the peripheral surface coating film 801 formed on the peripheral surface 100d of the front end portion 100b of the gas sensor element body 100a is removed using the scraper 500. FIG. 14 is similar to FIG. 13, but shows, similar to FIG. 11, a scraping-off step in a state where the gas sensor element body 100a (and the front end portion 100b) is rotated by 90 degrees (counterclockwise in FIG. 14) and the interval D2 is further narrowed with respect to the interval D1.

Specifically, after the excess coating film 801a1 has been removed in FIG. 13, the front end portion 100b is returned to a state where the front end portion 100b has been pulled up in the second dipping step (i.e., a state where, after the scraping-off in FIG. 13, the front end portion 100b has been moved downwardly through the opening 503 having the interval D1), then, the movement mechanism is operated so as to narrow the interval up to the interval D2, and then, the front end portion 100b is pulled up through the opening 503 having the interval D2.

When the front end portion 100b is moved downwardly through the opening 503 having the interval D1, it is preferable to adjust the height so as to prevent the front end portion 100b from being dipped again into the dipping chamber 450.

In FIG. 14, when the peripheral surface coating film 801 that has a thickness exceeding the necessary thickness is attached to the front end portion 100b, the coating film (excess coating film) 801a2 corresponding to the exceeding amount is scraped off by the sides E, E when the front end portion 100b passes through the opening 503 (the pair of sides E, E) of the scraper 500 from the lower side to the upper side. In this manner, when the front end portion 100b passes between the sides E, E, the excess coating film 801a2 is separated from the peripheral surface coating film 801 corresponding to the necessary thickness.

Accordingly, the thickness (width) of the second coating film 800 in a direction perpendicular to the protection layer 111 (main surface) is adjusted to the interval D2.

As a result, the thicknesses (widths) of the second coating film 800 are respectively adjusted to the intervals D1, D2 by the scraper 500.

In the above embodiment, pulling up the gas sensor element body 100a realizes an operation of causing the scraper 500 to relatively move toward the front end surface 100c, and simultaneously, of causing scraping-off by means of the sides E, E to be carried out. However, conversely, for example, pulling down the gas sensor element body 100a may cause the scraper 500 to relatively move toward the rear end of the gas sensor element body 100a, and simultaneously, may cause the scraping-off to be carried out. However, the above embodiment is preferable because there is no possibility that the separated excess coating film 801a1 attaches to the gas sensor element body 100a.

In the above embodiment, after the operation of performing the scraping-off on the peripheral surface coating film 801 in a direction parallel to the protection layer 111 (main surface) shown in FIG. 13, an operation of carrying out the scraping-off on the peripheral surface coating film 801 in a direction perpendicular to the protection layer 111 (main surface) shown in FIG. 14 is performed. However, the order of performing the scraping-off may be reversed.

FIG. 15 illustrates how, in the scraping-off step, the part (excess coating film) 802a of the front end coating film 802 formed on the front end surface 100c of the front end portion 100b of the gas sensor element body 100a is removed using the scrape-off blade 600. In FIG. 15, details of the front end surface scraping-off step described above are shown. After the peripheral surface scraping-off step, the gas sensor element body 100a having passed through the opening 503 of the scraper 500 from the lower side to the upper side is moved upward for the front end surface scraping-off step such that the position of the front end surface 100c of the front end portion 100b is at a predetermined height position that is determined in advance.

The predetermined height position of the front end surface 100c for the front end surface scraping-off step is set such that the thickness of the front end coating film 802 formed on the front end surface 100c becomes a thickness necessary for the porous protection layer 20 after the front end surface scraping-off step.

In the case of the present embodiment, the height position of the front end surface 100c when the front end surface scraping-off step is performed is set so as to be the same as the height position of the front end surface 100c of the gas sensor element body 100a resting at the stand-by position described above. In another embodiment, the height position of the front end surface 100c when the front end surface scraping-off step is performed may be different from the height position of the front end surface 100c of the gas sensor element body 100a resting at the stand-by position.

In FIG. 15, the gas sensor element body 100a in a state of resting at the stand-by position is shown. The front end portion 100b of the gas sensor element body 100a in that state has formed thereon the coating film 800 including the peripheral surface coating film 801 of which the thickness has been adjusted, with the excess coating films 801a1, 801a2 removed. When, with respect to the coating film 800, the front end coating film 802 formed on the front end surface 100c has a thickness exceeding the necessary thickness, the coating film (excess coating film 802a) corresponding to the exceeding amount is scraped-off by the scrape-off blade 600.

The scrape-off blade 600 is formed of a metal plate member processed in a predetermined shape, for example. The scrape-off blade 600 is configured using a known reciprocation mechanism or the like such that a leading end portion 601 thereof can reciprocate along the horizontal direction. In the scraping-off step, the height position of the leading end portion 601 of the scrape-off blade 600 and the height position of the front end portion 100b of the gas sensor element body 100a are set such that the front end coating film 802 corresponding to the necessary thickness remains on the front end surface 100c.

It should be noted that, in FIG. 9, the gas sensor element body 100a is disposed such that the longitudinal direction thereof extends along the vertical direction (the up-down direction). The axial direction (the direction of the axial line L) of the gas sensor element body 100a extends along the vertical direction. Therefore, it can be said that the scrape-off blade 600 moves along a direction perpendicular to the axial line direction of the gas sensor element body 100a.

As shown in FIG. 9 and the like, the scrape-off blade 600 is resting at the withdrawn position during each of the first and second dipping steps and the peripheral surface scraping-off step described above. When the gas sensor element body 100a is returned to the stand-by position and rests after the peripheral surface scraping-off step, the scrape-off blade 600 moves in the horizontal direction so as to scrape-off the excess coating film 802a of the front end coating film 802. The scrape-off blade 600 horizontally moves such that the leading end portion 601 horizontally moves from the withdrawn position to the gas sensor element body 100a side, and further horizontally moves so as to cross the opening 503 in the longitudinal direction above the opening 503. When the scrape-off blade 600 horizontally moves so as to cross the opening 503, the leading end portion 601 cuts off the excess coating film 802a corresponding to a thickness exceeding the necessary thickness, from the front end coating film 802 corresponding to the necessary thickness. In this manner, when the front end coating film 802 formed on the front end surface 100c has a thickness exceeding the necessary thickness, the coating film (excess coating film 802a) corresponding to the exceeding amount is scraped-off by the scrape-off blade 600.

Figure 16:
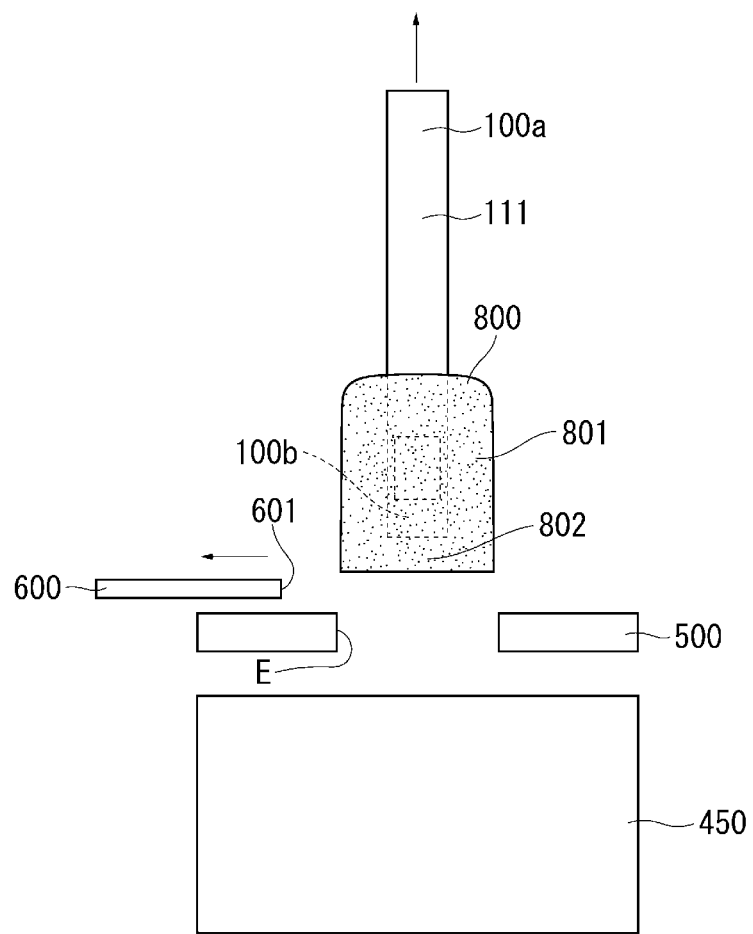
FIG. 16 is an explanatory diagram showing how the scrape-off blade is returned to a withdrawn position after the scraping-off step.

FIG. 16 illustrates how, after the scraping-off step, the scrape-off blade 600 is returned to the withdrawn position. After scraping off the excess coating film 802a of the front end coating film 802, the scrape-off blade 600 again horizontally moves so as to be returned to the withdrawn position, in an opposite direction to the direction taken when performing the scraping-off step.

Through the scraping-off step (the peripheral surface scraping-off step, the front end surface scraping-off step) as described above, the thickness of the coating film 800 formed on the front end portion 100b of the gas sensor element body 100a is adjusted so as not to be too large.

It should be noted that, in the scraping-off step, it is preferable that the solidified first coating film 700 is not subjected to scraping-off. This is because if the solidified first coating film 700 is subjected to scraping-off, the first coating film 700 may be broken or the movable blades 501, 502 (the side E, E) may be deformed. For realizing "the solidified first coating film 700 is not subjected to scraping-off", specifically, each of the intervals D1, D2 may be set to be larger than the thickness of the solidified first coating film 700. Alternatively, for example, the thickness of the solidified first coating film 700 according to a predetermined dipping time, the viscosity of the slurry S1, or the like are measured in advance, and the intervals D1, D2 may be set on the basis of the measurement value.

After the scraping-off step, when the coating film 800 having a sufficient thickness for forming the porous protection layer 20 has been formed on the front end portion 100b of the gas sensor element body 100a, the gas sensor element body 100a is subjected to a sintering step as necessary. Before the sintering step, a second drying step for drying the coating film 800 may be provided.

The sintering step is a step of sintering the coating film 800 having been subjected to the scraping-off step, to obtain the porous protection layer 20. As long as the coating film 800 is sintered and the porous protection layer 20 can be obtained, various conditions such as sintering temperature and sintering time in the sintering step are not limited in particular, and are set as appropriate according to the intended application. The sintering step is performed under a condition of 1000° C. and three hours, for example.

As described above, in the method for producing the gas sensor element of the present embodiment, through the first dipping step, the drying step, the second dipping step, and the scraping-off step, the front end portion 100b where the detection portion 150 of the gas sensor element 100 (the gas sensor element body 100a) is disposed can be covered by the porous protection layer 20, and the gas sensor element 100 (see FIG. 3 to FIG. 5) provided with the porous protection layer 20 as described above can be obtained. According to the method for producing the gas sensor element of the present embodiment, the thickness of the coating film 800 made of the slurry S2 for forming the outer protection layer 22 can be adjusted to a desired thickness through the scraping-off step.

Thus, according to the method for producing the gas sensor element of the present embodiment, since the inner protection layer 21 and the outer protection layer 22 are each formed by the dip method, skill is not required unlike the spray method, an increase in cost can be suppressed, and the inner protection layer 21 and the outer protection layer 22 can be formed in a simple manner. In addition, since the thickness of the outer protection layer 22 is made substantially uniform in the direction of the axial line L in the scraping-off step, nonuniformity in the thickness of the layer can be reduced, and activation delay due to excessive heat capacity can also be suppressed.

Since the inner protection layer 21 is left as is as having been formed by the dip method and is not subjected to the scraping-off step, the thickness thereof in the direction of the axial line L is nonuniform (see FIG. 6). However, the thickness in the direction of the axial line L of the outer protection layer 22 positioned outside the inner protection layer 21 is made substantially uniform in the scraping-off step. Therefore, in terms of the outer shape of the porous protection layer 20 composed of the inner protection layer 21 and the outer protection layer 22, the thickness is substantially uniform. As a result, an increase in heat capacity due to nonuniformity in the thickness of the entirety of the layer can be suppressed.

As shown in FIG. 6, in the inner protection layer 21 left as is as having been formed by the dip method, the thickness of each corner portion 21e on the front end side is reduced. However, the thickness corresponding to the reduced amount is compensated for by the outer protection layer 22, and as the entirety of the porous protection layer 20, the thickness of the corner portion is ensured. That is, problems caused by decrease in the thickness of the corner portion 21e due to the dip method can also be eliminated.

Performing the front end surface scraping-off step in a state where the scrape-off blade 600 is disposed on the upper surface 500a side of the scraper 500 and is separated from the upper surface 500a is preferable when compared with performing the front end surface scraping-off step in a state where the scrape-off blade 600 is disposed on the lower surface side of the scraper 500. This is because horizontal movement of the scrape-off blade 600 is less likely to be hindered by influence and the like of the hardened matter of the removed excess coating film 802a and the like.

The present invention is not limited to the above-described embodiments, but is applicable to various modifications and equivalents encompassed by the concept and scope of the present invention.

In the above embodiment, the scraper 500 is disposed immediately above the dipping chamber 450, and when the gas sensor element body 100a is moved in a step such as the dipping step other than the scraping-off step, the gas sensor element body 100a and the coating film 700, 800 are moved so as not to contact the scraper 500. However, the present invention is not limited to this form.

For example, the scraper 500 may be disposed not immediately above the dipping chamber 450 and may be disposed at a different position. In this case, it is not necessary to accurately move the gas sensor element body 100a such that the gas sensor element body 100a and the coating film 700, 800 do not contact the scraper 500 during the dipping step, and the gas sensor element body 100a only needs to be moved upward and downward so as to correspond to the region to which the slurry is desired to be attached.

Then, after the dipping step, the scraper 500 and the gas sensor element body 100a may be relatively moved so as to be close to each other, to perform the scraping-off step.

In the above embodiment, the scraper 500 includes a pair of movable blades 501, 502, and the interval between the movable blades 501, 502 is adjusted, to carry out the scraping-off on the coating film 800. However, the present invention is not limited thereto, and a frame-shaped scraper having a predetermined size may be used.

In the scraping-off step, scraping-off may be performed such that the surface of the second coating film having been subjected to the scraping-off becomes a flat surface. When the scraping-off is performed in this manner, the second coating film, and consequently, the outer protection layer become flat (straight shape).

As the gas sensor element 100, a NOx sensor element or the like can be used, other than the oxygen sensor element.

The shape of the opening 503 (the sides E, E) is not limited to that described above, and may be set to a shape other than a linear shape as appropriate, in accordance with the shape of a requested porous protection layer.

The porous protection layer of the gas sensor element produced by the above-described production method may be subjected to a cutting process or the like by laser, a cutter, or the like, to finely adjust the shape of the porous protection layer.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based on Japanese Patent Application No. 2020-135828 filed Aug. 11, 2020, the disclosure of which is incorporated herein by reference in its entirety.

What is claimed is:

1. A method for producing a gas sensor element extending in a direction of an axial line thereof and having a detection portion disposed on a front end side thereof, the detection portion being covered by, as a porous protection layer, an inner protection layer that is porous and an outer protection layer that is porous and that has a porosity different from a porosity of the inner protection layer, in this order, the method comprising:
 a first dipping step of dipping the front end side of the gas sensor element into a first slurry for the inner protection layer, to form a first coating film made of the first slurry on a front end surface and a peripheral surface of the gas sensor element;
 a drying step of drying and solidifying the first coating film;
 a second dipping step of dipping, without removing the first coating film, the front end side of the gas sensor element into a second slurry for the outer protection layer, to form a second coating film made of the second slurry on an entirety of a surface of the solidified first coating film; and
 a scraping-off step of performing scraping-off on the second coating film so as not to scrape-off the solidified first coating film, to remove a part of the second coating film.

2. The method for producing the gas sensor element as claimed in claim 1, wherein the scraping-off step is performed such that a surface of the second coating film having been subjected to the scraping-off becomes a flat surface.

3. The method for producing the gas sensor element as claimed in claim 1, wherein
 the scraping-off step includes:
  a peripheral surface scraping-off step of scraping-off and removing a peripheral part of the second coating film; and
  a front end surface scraping-off step of scraping-off and removing part of a front end side of the second coating film, and
 the front end surface scraping-off step being performed after the peripheral surface scraping-off step.

4. The method for producing the gas sensor element as claimed in claim 2, wherein
 the scraping-off step includes:
  a peripheral surface scraping-off step of scraping-off and removing a peripheral part of the second coating film; and a front end surface scraping-off step of scraping-off and removing part of a front end side of the second coating film, and the front end surface scraping-off step being performed after the peripheral surface scraping-off step.

5. A gas sensor element extending in a direction of an axial line thereof and having a plate shape that has opposing main surfaces, the gas sensor element comprising:

a detection portion at a front end side thereof; and a porous protection layer configured to cover the detection portion, wherein the porous protection layer comprises an inner protection layer and an outer protection layer that is porous, the outer protection layer having a porosity different from a porosity of the inner protection layer, and that covers the inner protection layer, the inner protection layer has a maximum thickness region along the direction of the axial line, and has a reduced thickness from the region of maximum thickness toward a front end side and a rear end side of the inner protection layer, the outer protection layer has a flat front end surface and flat side surfaces, and when viewed in a direction perpendicular to the main surfaces, a rear end edge on a radially outermost side of the outer protection layer has a shape in which a center portion of the rear end edge in a width direction of the gas sensor element is recessed to the front end side with respect to a rearmost end.

6. A gas sensor, comprising:

the gas sensor element according to claim 5;

a metal shell which holds the gas sensor element; and a protector mounted to a front end portion of the metal shell.

7. The gas sensor according to claim 6, wherein the protector covers a front end portion of the gas sensor element, protruding from a front end of the metal shell, and has a plurality of gas introduction holes.

* * * * *